(12) United States Patent
Struble et al.

(10) Patent No.: US 10,225,134 B1
(45) Date of Patent: Mar. 5, 2019

(54) CATEGORIZING SYSTEMS AT SCALE USING SYSTEM ATTRIBUTES

(71) Applicant: EMC Corporation, Hopkinton, MA (US)

(72) Inventors: Craig Andrew Struble, San Jose, CA (US); Christopher Hercules Claudatos, San Jose, CA (US); Michael John Dutch, Los Gatos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 178 days.

(21) Appl. No.: 14/755,761

(22) Filed: Jun. 30, 2015

(51) Int. Cl.
*H04L 12/24* (2006.01)

(52) U.S. Cl.
CPC ............................. *H04L 41/0286* (2013.01)

(58) Field of Classification Search
CPC .................................................. H04L 41/0286
See application file for complete search history.

(56) References Cited

U.S. PATENT DOCUMENTS

| | | | | |
|---|---|---|---|---|
| 7,860,825 | B2 * | 12/2010 | Chatterjee | G06F 17/30194 705/51 |
| 8,515,910 | B1 * | 8/2013 | Certain | G06F 17/30088 707/637 |
| 2005/0038827 | A1 * | 2/2005 | Hooks | G06F 11/0748 |
| 2009/0198559 | A1 * | 8/2009 | Wang | G06Q 10/087 705/7.31 |
| 2009/0276255 | A1 * | 11/2009 | Bhatt | G06Q 10/06 705/7.23 |
| 2010/0235003 | A1 * | 9/2010 | Maly | G06F 1/206 700/276 |
| 2011/0270975 | A1 * | 11/2011 | Troup | G06F 11/2294 709/224 |
| 2013/0275816 | A1 * | 10/2013 | Bernstein | G06F 11/0754 714/48 |

* cited by examiner

*Primary Examiner* — Michael A Keller
(74) *Attorney, Agent, or Firm* — Peter Jovanovic; Theodore A. Chen; Krishnendu Gupta

(57) ABSTRACT

Intrinsic system metadata is received from the plurality of computer systems, wherein the intrinsic system metadata includes operational data reported by individual systems in the plurality of computer systems. The intrinsic system metadata is normalized to identify a representative. Individual outlier systems are identified by comparing operational data to the representative.

17 Claims, 4 Drawing Sheets

CATEGORIZING SYSTEMS AT SCALE USING SYSTEM ATTRIBUTES

FIELD OF THE INVENTION

This invention relates generally to system defect and optimization discovery, and more particularly to systems and methods for categorizing a number of systems at scale.

BACKGROUND OF THE INVENTION

In our data driven world, computer systems are becoming increasingly complex. In an effort to keep mission critical systems online, it is necessary to ensure they are optimally configured and free of defects. This may involve resolving issues as they arise as quickly as possible. To help resolve such issues, computer systems typically record status information. These records may contain information from a single application or a system as a whole.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
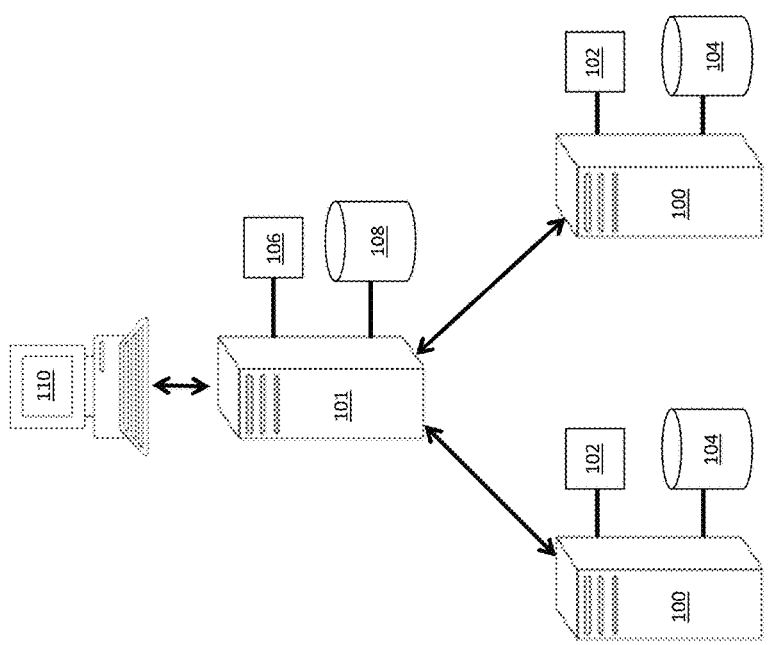
FIG. 1 illustrates system for identifying defect solutions and system optimizations consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

A system, method, and process are discussed herein for automating system defect and optimization discovery. Computer systems, such as application or web servers, back-up and archiving systems, databases, personal computers and devices, and the like, may monitor and record billions of data points throughout their operation. These data points may include, among others, CPU utilization, drive capacity, available network bandwidth, and/or system downtime. The data points may be recorded in log files and used to identify and/or resolves issues both as they arise and preemptively. Additionally, they may be used to identify unexpected system optimizations.

Identifying systems defects or optimizations from log files may be tedious, time consuming, and expensive. In some embodiments, this is a manual process that becomes more complex as the number of systems increases. A user may need to comb through gigabytes of files searching for potential issues. For example, it may take a matter of minutes to identify an issue in a log file for a single application operating on a user's personal computer. It may take hours, days, or even weeks, however, to identify the cause of a crash in a complex data storage system. For mission-critical applications it is essential to minimize the amount of effort needed to identify and resolve system defects, and/or resolve the defects before they occur.

The system herein addresses these needs. In an embodiment, a plurality of computer systems may communicate system data to a central system. This system data may include all of the data points discussed above, in addition to any other attributes beneficial for monitoring system health and performance. These attributes may comprise both intrinsic and extrinsic metadata about the systems. The central system may include logic, such as data normalization algorithms, for analyzing the received data. This logic may identify representative expectations for the systems. Individual systems may then be compared to these representatives to identify those operating in an unexpected state. For example, the logic may identify systems that are operating unexpectedly well. Those systems may be analyzed to derive a system optimization, and that optimization may be distributed to other systems.

Turning now to FIG. 1, a system for analyzing and organizing computer systems is discussed. A plurality of reporting systems 100 may be in communication with central system 101. The reporting systems may include processors 102 and non-transitory computer readable mediums 104, and central system 101 may include processor 106 and non-transitory computer storage medium 108. Reporting systems 100 may report system performance and configuration information back to central system 101, and central system 101 may store the information in non-transitory computer storage medium 108. Central system 101 may thereafter normalize the data to identify representatives and identify outlier systems from these representatives. These outlier systems could contain, for example, specific system optimizations and/or system defects. Identified optimizations and/or defect solutions may then be distributed back to reporting systems 100 as necessary or desired. In some embodiments, central system may be accessed via client 110.

In some embodiments, reporting systems 100 may have a similar function and/or purpose. For example, systems 100 may comprise backup and archive systems, such as a Data Domain® storage system, and each individual system may operate at a different location. One backup system may be installed at a first client site and be utilized only by that client, while a second system operates at a second client site. While FIG. 1 depicts a single server for each reporting system, a reporting system may comprise any number of machines. For example, a given reporting system 100 may comprise multiple nodes in a high-performance computing cluster.

In some embodiments, central system 101 may comprise a system optimized for storing and processing massive amounts of data in parallel. Central system 101 may be, for example, a massive parallel-processing ("MPP") database, such as Greenplum Database. Further, while central system 101 is only depicted as a single server in FIG. 1, the system may comprise any number of machines. For example, central system 101 may comprise a plurality of nodes in a cluster. This may be particularly beneficial when there are a large number of reporting systems 100 transmitting a large amount of data.

Central system 101 may be controlled by a vendor, developer, or manufacturer of reporting systems 100. These parties may therefore access the central system, and the data it contains, to derive usage information about their products. This information may be used to derive product insights and improvements, as discussed below.

In some embodiments, hundreds or thousands of attributes may be used to cluster the reporting systems. These attributes may be either intrinsic or extrinsic to the systems. For example, the attributes may include intrinsic performance attributes, such as CPU utilization, memory utilization, system user-load, current system load (i.e. number of jobs), system load over a given time (e.g. last five and/or 15 minutes), system uptime, number of files on the system, individual file size, aggregate files size, file age, system I/O load, system garbage collection, cleaning, and/or data compression. Similarly, the attributes may include configuration attributes, such as network topology, system model (e.g. name, serial number, and/or model number), operating system ("OS"), OS version (major and/or minor), OS build, host, domain, domain topology, system administrator email, firmware identifier(s), firmware version(s), driver identifier(s), driver version(s) and/or system location.

Figure 2:
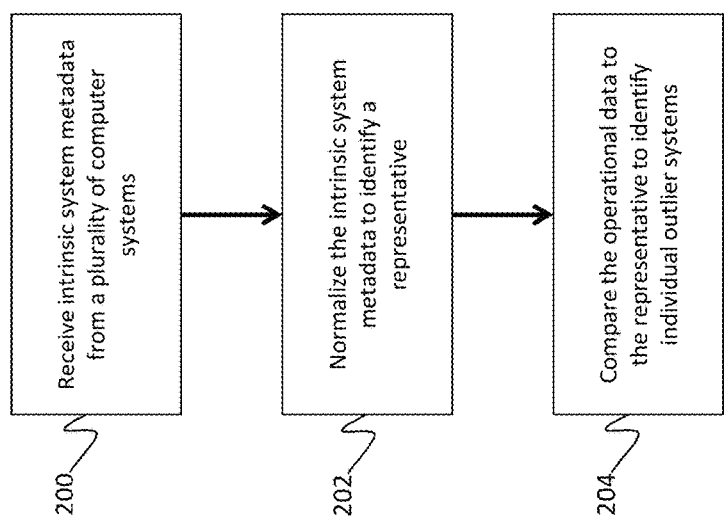
FIG. 2 is a flowchart depicting a process for identifying outlier computer systems consistent with an embodiment of the present disclosure.

FIG. 2 depicts a process for categorizing systems consistent with an embodiment of the present disclosure. In some embodiments, the systems shown in FIG. 1 may report intrinsic metadata to a central system for analysis. This intrinsic metadata may comprise information about the operational state of each individual system, such as the attributes discussed above. Additionally or alternatively, the intrinsic metadata may include operational data about a logical grouping of systems, such as all the systems in a datacenter. Data analysis techniques may be applied to this intrinsic metadata to derive insights about the systems. For example, one system may be performing exceptionally well compared to others. The analytic techniques may identify that system, and a user or other process may determine what factors enable the system to perform unexpectedly well. Similarly, a system may be performing poorly and the techniques may flag that system for repairs or patching. The flowchart of FIG. 2 discusses this process.

At block 200, intrinsic system metadata may be received from a plurality of computer systems. This metadata could be received, for example, at system 101 in FIG. 1. Similarly, the metadata may be transmitted by systems 100 depicted in FIG. 1. In some embodiments, this intrinsic metadata includes operational data reported by individual systems in the plurality of systems. For example, each individual system may report its storage capacity, bandwidth utilization, CPU utilization, memory utilization, running processes, etc. This information may be used to infer the health of the individual machines. For example, a machine with a consistently high CPU utilization may be considered unhealthy, particularly if other reporting machines do not have a high CPU utilization.

In some embodiments, the reported intrinsic metadata may be aggregated at the central system. This aggregation could involve, for example, storing the intrinsic metadata to persistent storage. This allows the systems to be analyzed over a period of time, rather than in the moment the data is received. It also enables systems to be compared against each other or against the whole rather than making an immediate health determination. For example, a system with high CPU utilization may not be unhealthy. The system may simply be running a CPU intensive process when its intrinsic metadata is reported, and most of the time its CPU utilization is very low. Aggregating data about this system, as well as others, may enable the analytic techniques to identify more meaningful trends.

At block 202, the intrinsic metadata and/or the aggregated metadata may be normalized to identify a representative. Additionally or alternatively, the metadata may be analyzed to identify a collection of representatives. For example, the central system or an external system, such as client 110, may normalize the intrinsic metadata. The metadata may be normalized on a plurality of dimensions. For example, the metadata may be normalized against the operational data itself. Additionally or alternatively, the metadata may be normalized by time.

Normalizing metadata based on the operational data may help identify individual outlier systems. For example, CPU utilization from a plurality of data systems may be normalized to identify a representative, which could be one representative in a collection of representatives. This could be achieved using standardization/z-scores, calculating the means, applying a scaling factor, or using any other data normalization technique. In some embodiments, the representative may be a baseline or expected value. The representative derived from the normalized data may indicate how systems are expected to perform. Systems reporting operational metadata that varies from the representative may be considered exceptionally healthy or unhealthy, and may warrant further investigation.

In some embodiments, the metadata may be normalized based on a plurality of attributes. This could result in a single representative for multiple data attributes or a collection of representatives. For example, a different representative may be derived for each attribute reported (e.g. CPU utilization, storage utilization, system temperature, etc) and each different representative may form a collection. Additionally or alternatively, the metadata may be normalized based on a combination of related and/or unrelated attributes. Different normalization techniques may be applied to different attributes, and/or multiple normalization techniques may be applied to the same attribute to form multiple representatives. For example, CPU utilization may have multiple representatives formed from multiple normalization techniques.

The intrinsic metadata may also be normalized based on time. Normalizing the metadata based on time may account for reporting differences between systems. For example, a first system may report intrinsic metadata a midnight eastern time, while a second system may report intrinsic metadata at midnight pacific time. Time normalization may account for these reporting discrepancies. One example to time normalization may be interpolation, such as linear or polynomial interpolation. Interpolation may enable predictions to be made about the performance of a system between reporting times. Additionally or alternatively, time series clustering techniques may be applied.

In some embodiments, normalizing the data and identifying the representative or a collection of representatives is two separate steps in a process. For example, a first algorithm may normalize the data and a second algorithm may identify the representative. Alternatively, the normalization and representative identification may be performed in a single step or by a single algorithm.

Once the intrinsic metadata is normalized and a representative is identified, individual outlier systems may be identified at block 204. These outlier systems may be individuals or groups of systems that deviate meaningfully from the representative. For example, if a system is more than one standard deviation away from the representative, it may be considered an outlier. Outlier systems may be systems that are performing poorly or well compared to the representative. If a system is performing well, an administrator may attempt to figure out why so that the benefits can be applied to other systems. Similarly, a poorly performing system may have a problem, such as a virus, which needs to be rectified.

As used herein, an administrator may be a human user. Additionally or alternatively, the administrator may be an automated or other system, such as system 101. The administrative system could, for example, have a set of policies that are dynamically selected to identify outlier systems. In some embodiments, the administrative system may analyze data specific to an outlier system, such as the intrinsic metadata or extrinsic metadata discussed below, to identify elements or combinations of elements that differ from the systems used to form the representative. For example, the administrative system may the outlier's configuration settings may be analyzed for deviations from the norm, such as a different firmware version, operating temperature, or CPU model.

In some embodiments, identifying outlier systems may comprise comparing the systems to a collection of representatives. A system performing outside expectations for a single representative may not warrant identifying the system as an outlier. Rather, outliers may be systems performing outside expectations for a subset or entirety of a collection. In some embodiments, representatives in a collection are processed serially to identify outliers. Additionally or alternatively, the representatives may be processed in parallel. The representatives may also be divided such that some are processed serially, and others are processed in parallel. Parallel processing could be enabled, for example, using a multi-core processor or a clustered computing system.

Once an outlier system is identified, an administrator may research that system's attributes to identify the reason for the deviation. Information such as operating system, hardware, firmware, network configuration, etc. may be examined to determine the cause of the deviation. This information may be reported by the system itself, or it may be determined from a catalog, log, or profile of all the reporting systems. This catalog, log, or profile could be stored, for example, on the central system receiving the intrinsic metadata information. In an embodiment, each reporting system has its own stored profile. In some embodiments, the cause for the deviation may be derived from a representative itself or a collection of representatives. For example, a system may be an outlier based on representatives for firmware version, CPU utilization, and memory utilization. An administrator may thereafter determine that a particular version of the firmware is adversely or positively impacting CPU and memory utilization.

Figure 3:
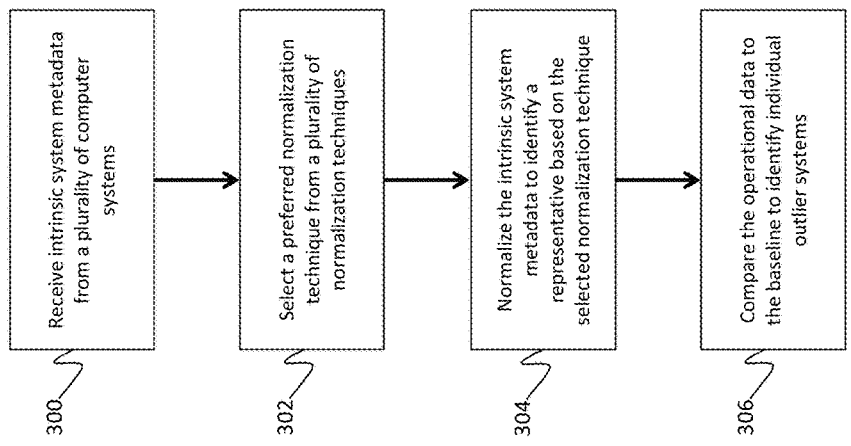
FIG. 3 is a flowchart depicting a process for selecting a normalization technique for identifying outlier computer systems consistent with an embodiment of the present disclosure.

Turning now to FIG. 3, a process for selecting a preferred normalization technique is discussed. As discussed above, multiple normalization techniques may be applied to one or more attributes. In some embodiments, certain normalization techniques may produce better results for certain attributes or groups of attributes. For example, some normalization techniques may result in a representative with less variance than others. FIG. 3 depicts a process for selecting a preferred technique.

At block 300, intrinsic metadata information may be received from a plurality of computer systems. This block could be, for example, substantially similar to block 200 discussed above.

At 302, a preferred normalization technique may be selected from a plurality of techniques. In an embodiment, selecting a preferred technique for an attribute may comprise applying several different normalization techniques to that attribute and examining the results. For example, the system may iterate through several different normalization techniques and identify the one producing a representative with minimal variance as the preferred technique. Additionally or alternatively, the representative with the most variance could be identified as the preferred technique. In some embodiments, an administrator may assign the preferred technique. For example, an administrator may determine that standardization may always be the preferred technique, and not iterations may occur. Further, some embodiments may identify multiple preferred normalization techniques.

Once a preferred technique is selected, it may be applied to the intrinsic data at block 304. This may be substantially similar to block 202 discussed above. If the preferred technique was selected based on iterating through several different normalization techniques, the output from the iteration process may be used as the representative and this step may be skipped. If multiple preferred techniques were identified, they may all be applied to the intrinsic metadata to form a collection of representatives.

Finally, at block 306, operational data may be compared to the representative or collection of representatives to identify individual outlier systems. This could be substantially similar to block 202 discussed above.

Figure 4:
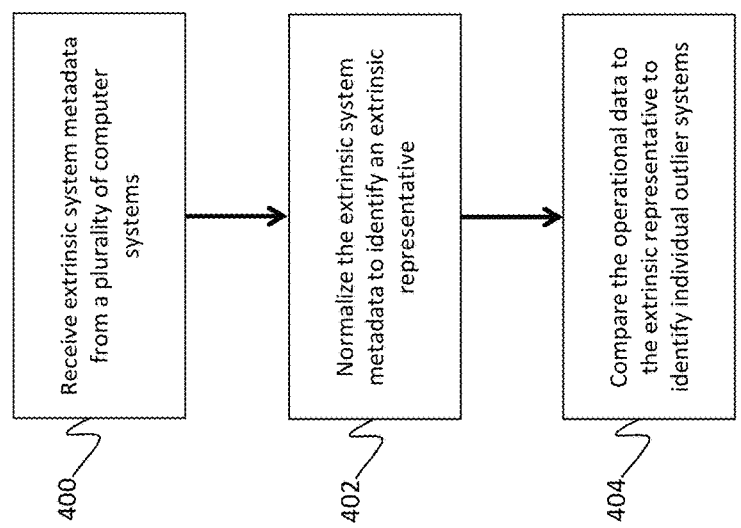
FIG. 4 is a flowchart depicting a process for normalizing computer systems based on extrinsic data consistent with an embodiment of the present disclosure.

Turning now to FIG. 4, a process for analyzing systems based on extrinsic metadata is discussed. Extrinsic metadata may comprise information that affects the systems, but does not come from the systems themselves. For example, extrinsic metadata may be environmental data, such as temperature, humidity, altitude, light/dark, pressure, etc. that may affect the performance of the machines.

At block 400, extrinsic metadata is received from a plurality of computer systems. These computer systems could be, for example, the same systems reporting intrinsic data. Additionally or alternatively, the extrinsic metadata may be received from different systems and/or sensors. For example, a smart thermostat may report information about the humidity and temperature of the room the systems are operating in. Similarly, a barometer may report the pressure of the room. In some embodiments, the extrinsic data may be derived from external sources, such as news and/or weather outlets. Users accessing the computer systems may also report the extrinsic metadata.

At block 402, the extrinsic metadata may be normalized. This process may be substantially similar to the normalization processes discussed above. In an embodiment, both extrinsic and intrinsic metadata are normalized. Alternatively, only extrinsic or only intrinsic metadata may be normalized. In some embodiments, a preferred extrinsic metadata normalization technique may be selected. The preferred normalization technique may be the same as or different than the intrinsic preferred data normalization technique.

Once the extrinsic metadata is normalized, it may be used to derive a representative or collection of representatives. The collection of representatives may comprise, for example, both intrinsic metadata representatives and extrinsic metadata representatives.

Finally, at block 404, operational data and/or other extrinsic metadata may be compared to an extrinsic metadata representative or a collection of representatives. This may be substantially similar to the comparison discussed above. In some embodiments, outlier systems may be identified for further analysis.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A computer-implemented method for organizing a plurality of computer systems based on individual system health to identify and propagate system optimizations, the method comprising:
   receiving intrinsic system metadata from the plurality of computer systems, wherein the intrinsic system metadata includes operational data reported by individual systems in the plurality of computer systems, the operational data comprising data for monitoring system health and performance;
   storing the intrinsic system metadata to persistent storage;
   selecting a preferred normalization technique from a plurality of normalization techniques by applying the plurality of normalization techniques to the intrinsic system metadata;
   normalizing the intrinsic system metadata using the preferred normalization technique to identify a representative;
   identifying individual outlier systems by comparing the operational data to the representative, wherein data from the individual outlier systems comprises system optimizations;
   deriving a system optimization from the intrinsic system metadata; and
   distributing the derived system optimization to the plurality of computer systems.

2. The method of claim 1, wherein normalizing the intrinsic system metadata comprises applying a computer implemented time normalization technique.

3. The method of claim 2, wherein the time normalization technique comprises interpolation.

4. The method of claim 1, further comprising receiving extrinsic system metadata about the plurality of computer systems.

5. The method of claim 4, wherein the extrinsic system metadata is reported by individual systems in the plurality of computer systems.

6. The method of claim 4, wherein the extrinsic system metadata is reported by at least one extrinsic system, wherein the extrinsic system is logically separate from the plurality of computer systems.

7. A system for organizing a plurality of computer systems based on individual system health to identify and propagate system optimizations, the system comprising a non-transitory computer readable medium and processor enabled to execute instructions for:
   receiving intrinsic system metadata from the plurality of computer systems, wherein the intrinsic system metadata includes operational data reported by individual systems in the plurality of computer systems, the operational data comprising data for monitoring system health and performance;
   storing the intrinsic system metadata to persistent storage;
   selecting a preferred normalization technique from a plurality of normalization techniques by applying the plurality of normalization techniques to the intrinsic system metadata;
   normalizing the intrinsic system metadata using the preferred normalization technique to identify a representative;
   identifying individual outlier systems by comparing the operational data to the representative, wherein data from the individual outlier systems comprises system optimizations;
   deriving a system optimization from the intrinsic system metadata; and distributing the derived system optimization to the plurality of computer systems.

8. The system of claim 7, wherein normalizing the intrinsic system metadata comprises applying a computer implemented time normalization technique.

9. The system of claim 8, wherein the time normalization technique comprises interpolation.

10. The system of claim 7, further comprising receiving extrinsic system metadata about the plurality of computer system.

11. The system of claim 10, wherein the extrinsic system metadata is reported by individual systems in the plurality of computer systems.

12. The system of claim 10, wherein the extrinsic system metadata is reported by at least one extrinsic system, wherein the extrinsic system is logically separate from the plurality of computer systems.

13. A non-transitory computer readable medium comprising processor instructions for organizing a plurality of computer systems based on individual system health to identify and propagate system optimizations, the instructions comprising:

receiving intrinsic system metadata from the plurality of computer systems, wherein the intrinsic system metadata includes operational data reported by individual systems in the plurality of computer systems, the operational data comprising data for monitoring system health and performance;

storing the intrinsic system metadata to persistent storage;

selecting a preferred normalization technique from a plurality of normalization techniques by applying the plurality of normalization techniques to the intrinsic system metadata;

normalizing the intrinsic system metadata using the preferred normalization technique to identify a representative;

identifying individual outlier systems by comparing the operational data to the representative, wherein data from the individual outlier systems comprises system optimizations;

deriving a system optimization from the intrinsic system metadata; and distributing the derived system optimization to the plurality of computer systems.

14. The non-transitory computer readable medium of claim 13, wherein the time normalization technique comprises interpolation.

15. The non-transitory computer readable medium of claim 13, wherein normalizing the intrinsic system metadata comprises applying a plurality of computer implemented normalization techniques.

16. The non-transitory computer readable medium of claim 13, further comprising receiving extrinsic system metadata about the plurality of computer systems.

17. The non-transitory computer readable medium of claim 16, wherein the extrinsic system metadata is reported by at least one extrinsic system, wherein the extrinsic system is logically separate from the plurality of computer systems.

* * * * *